United States Patent [19]

Sullivan

[11] Patent Number: 4,574,726
[45] Date of Patent: Mar. 11, 1986

[54] PORTABLE TEMPORARY EMERGENCY DISTRESS SIGNAL

[76] Inventor: Jeremiah F. Sullivan, 28 A Railroad St., Apt. 13, Methuen, Mass. 01844

[21] Appl. No.: 631,597

[22] Filed: Jul. 17, 1984

[51] Int. Cl.[4] .................. G09F 21/04; G09F 7/04; G09F 17/00
[52] U.S. Cl. .................. 116/28 R; 116/174; 40/592; 40/600; 40/610
[58] Field of Search .................. 116/28 R, 173, 174; 40/592, 600, 610, 591; 335/303; 248/206.5; 403/12, 100, 102

[56] References Cited

U.S. PATENT DOCUMENTS

| | | | |
|---|---|---|---|
| 1,108,217 | 8/1914 | Ostman | 403/102 |
| 2,506,400 | 5/1950 | Wietz | 248/206.5 |
| 2,694,587 | 11/1954 | Bullough | 403/100 |
| 2,720,718 | 10/1955 | Vaniman | 40/603 |
| 2,752,709 | 7/1956 | Gough | 40/591 |
| 2,764,122 | 9/1956 | Irvin | 116/173 |
| 2,887,983 | 5/1959 | Budd | 116/173 |
| 2,895,757 | 7/1959 | Kaspar | 403/100 |
| 2,977,082 | 3/1961 | Harris | 248/206.5 |
| 3,081,734 | 3/1963 | Spahl | 116/173 |
| 3,136,289 | 6/1964 | Johnson | 116/28 R |
| 3,148,856 | 9/1964 | Orlando | 116/173 |
| 3,241,516 | 3/1966 | Hopkins | 116/173 |
| 4,144,833 | 3/1979 | Newman, Sr. | 116/63 P |
| 4,375,134 | 3/1983 | Sheetz | 40/610 |

FOREIGN PATENT DOCUMENTS

| | | | |
|---|---|---|---|
| 123719 | 3/1947 | Australia | 403/102 |
| 1105660 | 7/1955 | France | 40/591 |

Primary Examiner—Charles Frankfort
Assistant Examiner—Thomas B. Will
Attorney, Agent, or Firm—Pearson & Pearson

[57] ABSTRACT

A portable, temporary, emergency distress signal capable of being collapsed and carried in the dash compartment of an automobile or quickly erected and placed on the outside of a stranded vehicle includes a telescopable, rod type staff, a magnet base and a fabric flag. The flag is rollable into a small roll, but held outstretched in use by a three section, pivot jointed, rod fitted into the edge seams. The telescopable staff is pivoted to the magnet base so that the staff may be vertical on top of the vehicle or at right angles, on the side of the vehicle. A sleeve lock slides over the pivot to hold the staff vertical, a sleeve lock stop holds the sleeve lock out of the way when the staff is at right angles to the magnet and the sleeve lock is threadedly secured.

1 Claim, 7 Drawing Figures

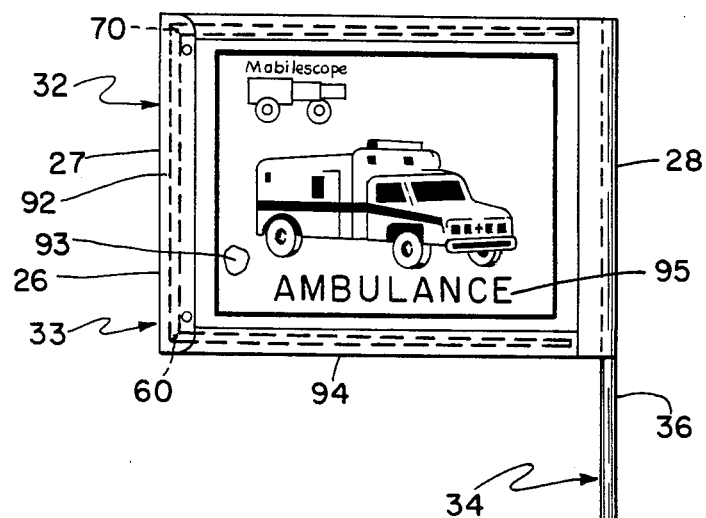
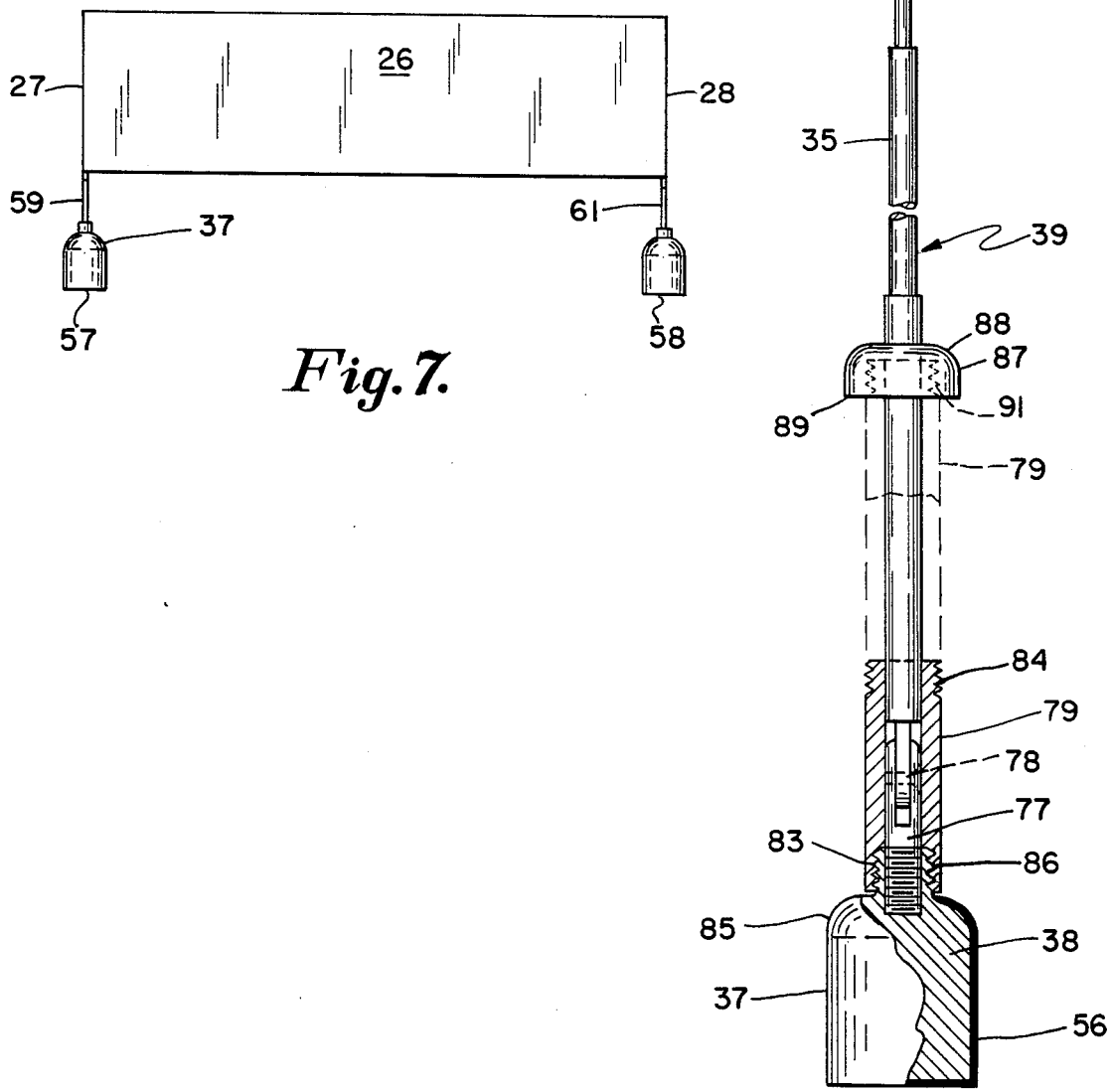
Fig. 7.
Fig. 6.

PORTABLE TEMPORARY EMERGENCY DISTRESS SIGNAL

BACKGROUND OF THE INVENTION

It has heretofore been proposed to provide a message or notice on a pole, or rod, by means of a flag wherein the flag is supported by a base.

U.S. Pat. No. 4,144,833 to Newman, Sr. of Mar. 20, 1979 an Emergency Signal has a base, a plurality of generally U-shaped magnetic assemblies within the base, a telescopic mast and loops connecting grommets around the mast.

In U.S. Pat. No. 3,996,882 to Martin, et al, of Dec. 14, 1976, a flag storage and display device includes a flag, a housing, a pivot arm, and motors for operating said device.

In U.S. Pat. No. 3,241,516 to Hopkins of Mar. 22, 1966, a flag holder is revealed which has the ability to remain in position on a vehicle during high speed and has a magnetic base and a resilient coil spring flag staff.

U.S. Pat. No. 3,225,734 to Bule of Dec. 28, 1965 discloses a combined telescopic flag pole and a nameplate holder etc.

In U.S. Pat. No. 2,447,075 to Madsen of Aug. 17, 1948 a signal flag storage and display support has a vertical stake adopted to be driven in the ground and bars to hold the flag body.

In U.S. Pat. No. 4,028,827 to Hufton of June 14, 1977 an improved warning sign can be attached or removed from a metal door frame and it includes a base member and mounting means, including a magnet and a telescopable rod and rod end holder.

In U.S. Pat. No. 4,090,468 to D'Spain of May 23, 1978 a signal apparatus is disclosed which includes a base an arm member pivotally connected, and a mast, etc.

It is also known in the funeral flag art to combine a magnetic base with a coil spring type pole the same being advertised in many funeral director catalogues.

In at least one funeral flag assembly, it is known to include a magnetic base, a coil spring pole, and a rigid wire which supports the flag in unfurled condition. The wire is affixed to the outside seams of the flag which is sometimes in oval shape.

The Newman and Bule Patents are of the telescopic flag pole type, but have no structure for holding the flag in unfurled position and are not collapsible to fit in the dash compartment of a vehicle.

The Hopkins and Newman Patents reveal magnetic bases and Hopkins has a coil spring pole. However, neither includes the combination of two rods for supporting the flag in unfurled position.

The Martin Patent revealed a flag storage assembly which when pivoted holds the flag in unfurled position, but when the pole is in vertical position does not hold the flag in unfurled upstanding position.

The Madsen and Hufton Patents do not have magnetic bases and are not capable of being furled and collapsed to fit the dash compartment of a vehicle.

The D'Spain Patent discloses a base member for attachment to the said vehicle which can pivot, but cannot be removed quickly to fit the dash compartment of a car.

Therefore, the above patents, and the funeral flag assembly do not include the combination of at least two rods which are substantially inflexible, collapsible, and maintain and support the flag in unfurled outstretched condition, and which are capable of being furled to fit the dash compartment of a vehicle by an occupant without opening the doors.

SUMMARY OF THE INVENTION

In accordance with the invention, a portable temporary emergency distress signal is for use primarily in connection with vehicles which are stranded or in need of service, or wherein the occupants need medical assistance.

The signal includes a normally flexible limp flag which can be furled to fit into the dash compartment of a vehicle, the flag is supported by at least two substantially inflexible telescopic rods each of said rods is connected to and support at least two sides of the flag in unfurled, upstanding position.

Each of the rods are collapsible to fit within the dash compartment of a vehicle.

A magnet base is affixed to at least one rod, and at least one rod has a pivot joint for adjusting the rod and flag to any angle.

The pivot joint on the rod is proximate the base and has a cylindrical lock sleeved on the base, and means for locking the lock to the base to secure the pivot joint and rod in upright vertical position.

At least one rod includes a lock stop and means for attaching the lock to the lock stop to secure the lock when not in use.

The signal can be easily removed from the said compartment and erected outside the vehicle by an occupant without opening the doors thereof, by lowering the windows slightly and reaching up to the roof.

BRIEF DESCRIPTION OF THE DRAWINGS

FIG. 6 is a side view similar to FIG. 2 but enlarged and with the sleeve lock in operative position and FIG. 7 is a side view of another embodiment.

DESCRIPTION OF THE PREFERRED EMBODIMENT

Figure 1:
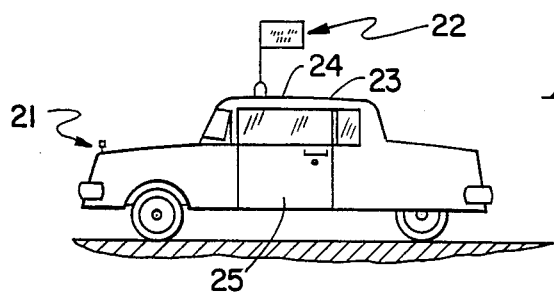
FIG. 1 is a side elevational view of a vehicle with the portable temporary emergency distress signal attached to the exterior thereof.

Referring to the drawings in detail and particularly FIG. 1, there is a disabled or stranded vehicle 21, and a temporary emergency distress signal 22, which can be attached to the exterior 23 of the vehicle, such as the roof 24 for notifying passersby that the occupants need help, gas, repairs, etc. The said signal 22, can be placed on a surface of the vehicle without the occupants opening the doors 25 of the vehicle.

Figure 3:
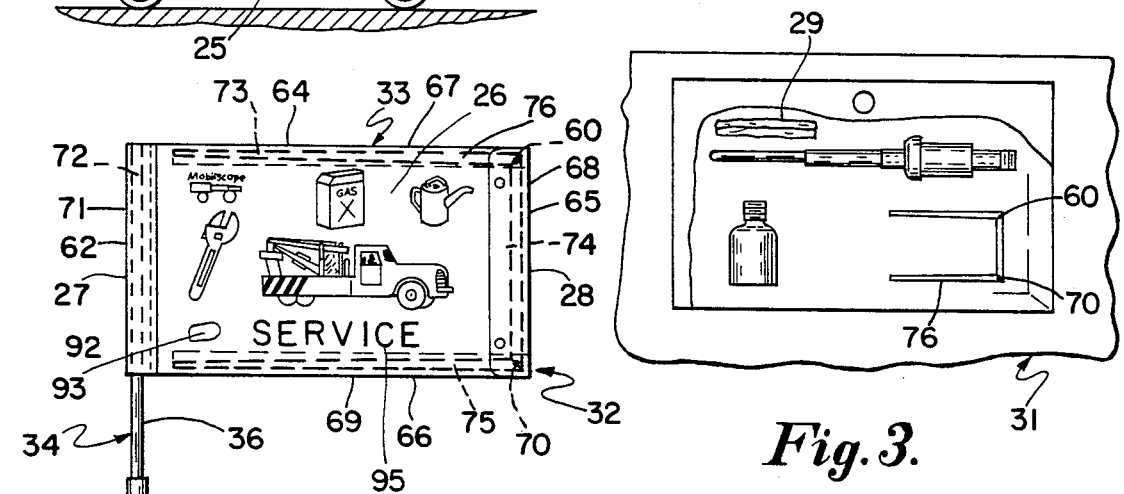
FIG. 3 is an enlarged view of a dash compartment with the signal and flag in furled position and the rod in collapsed position stored therein.
Figure 2:
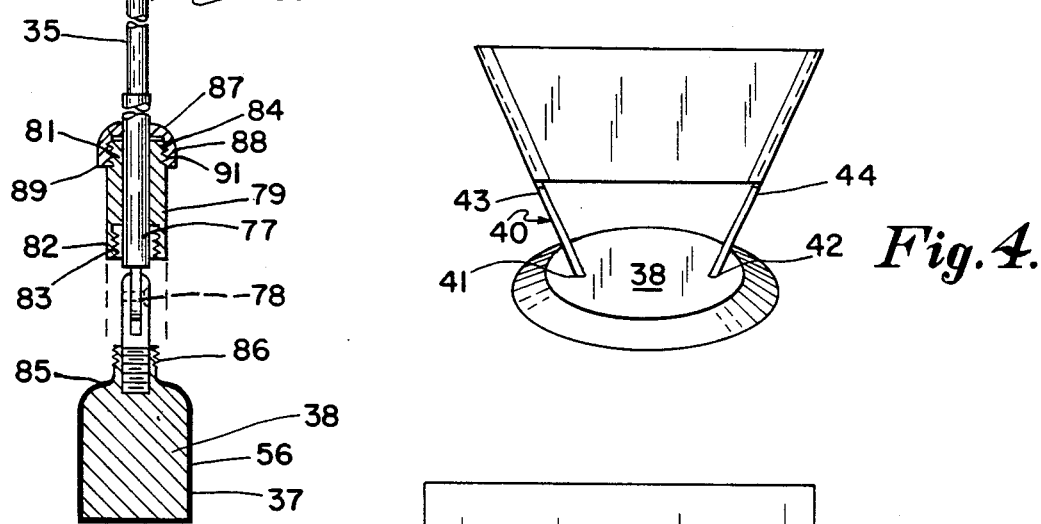
FIG. 2 is an enlarged side view of the preferred embodiment of the signal with the flag in unfurled position and the sleeve lock in inoperative position.

As best shown in FIG. 2, a normally flexible limp flag 26 has opposite side edges 27 and 28. In FIG. 3, the flag can be folded or furled as at 29, to fit the dash compartment 31, of the said vehicle 21, and can be unfurled as at 32, to form a stretched extended signal 33.

A support means 34 consists of a first substantially inflexible rod 35 in vertical position, and a second substantially inflexible rod 36 which are telescopably connected to each other to form the flag staff, rod 36 being connected to the side edge 27 of the flag 26 and supporting the flag in unfurled condition as at 32. The support means 34 can be removed and collapsed to fit the dash compartment of the vehicle 21.

A base 37 is affixed to the support means 34, and the preferred embodiment is a permanent magnet 38 supporting the support means 34 in upstanding position 39, on the exterior 23 of the vehicle 21.

Figure 4:
FIG. 4 is a side view of another embodiment of the portable temporary emergency distress signal.

As shown in FIG. 4, the permanent magnet 38 may have opposite ends 41 and 42, and two sectional telescopic collapsible rods 43 and 44, each of which protrude proximate the center to form a V-shaped support means 40.

Figure 5:
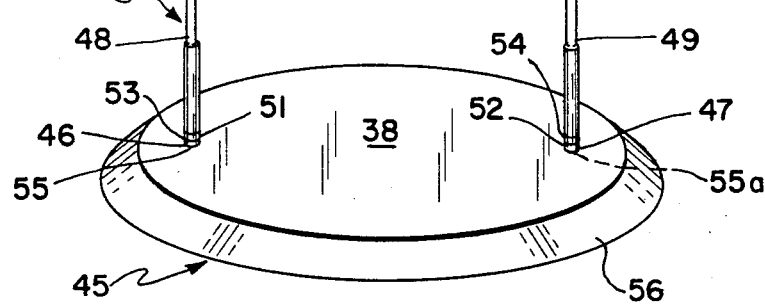
FIG. 5 is a side view of another embodiment.

In FIG. 5 there is a magnet 38 which is elongated as at 45 with opposite ends 46 and 47, and the flag is supported by at least two sectional telescopic collapsible rods 48 and 49. Each of the rods protrude from the opposite ends 46 and 47, of the base to form an H shaped support means 50.

Preferably, the elongated relatively flat permanent magnet 45 has a predetermined length and is threadedly attached to each rod at 51 and 52, the rods having threads at 53 and 54, and the magnet having threads at 55 and 55A, so that the magnet can be readily released for storage in the dash compartment.

The entire base 37 may be coated with a protective and scratch free coating 56, of trichlorethane, methylene chloride and aliphatic hydrocarbon.

As best shown in FIG. 7, the base 37 has at least 2 separate and permanent magnets 57 and 58, and at least two sectional telescopic collapsible rods 59 and 61, each protruding from one of the magnets 57 and 58, and each rod being connected to one of the opposite side edges 27 and 28 of the flag 26.

The rod 35 in FIG. 2 is connected to a side edge 27 of the flag at 62. The flag has a total of four side edges 27, 64, 28 and 66. Each of the side edges 27, 64, 28 and 66 have edge seams 67, 68, 69 and 71 with apertures 72, 73, 74, and 75 to receive a jointed rod 76 in each aperture of said edge. The jointed rod 76 76 may be in an open rectangular shape to maintain the flag in unfurled position and have three hinge pivoted sections, pivoted to each other as at 60 and 70.

The telescopable rod support means 34 has a lower end 77 affixed to the base 37 by a pivot joint 78 which is proximate the base for supporting the rod and flag in upstanding position as at 39 when the base is affixed to the exterior 23, of the vehicle 21.

A cylindrical lock 79 is sleeved on the rod, and has an upper portion 81 and a lower portion 82. The lower portion 82 has internal threads 83 and the upper portion 81 has external threads 84. The base 37 has an upper portion 85, and the upper portion has external threads 86, which engage the internal threads 83, so that when the lock is threadedly connected to the base it secures and encircles the pivot joint so that the rod will remain in upright position.

As shown in FIG. 6, wherein the rod has been cut away. the rod has a lock stop 87, and the lock stop has an upper portion 88, and a lower portion 89. The lock stop is positioned above the pivot joint and has internal threads 91 on the lower portion thereof. The external threads 84 of the lock 79 are engageable with the interior threads of the lock stop 87 to secure the lock when in inoperative position not in use. not in use.

The flag also includes a pair of opposite surfaces 92 and 93, and the flag is made of a material 94, which is resistant to high temperature and atmospheric degradation. The flag also has reflective indicia 95 on at least one said surface.

I claim:

1. A portable, temporary, emergency, distress signal capable of being carried in the dash compartment of an automobile but removable therefrom and expandable for attachment to the top or side of the automobile when stranded, said distress signal comprising:
   a flag staff formed of an upper rod telescopable within a lower rod, said upper rod having an upper portion and said lower rod having a lower portion;
   a rectangular distress flag, of limp material, having four side edges, each side edge having a hollow seam, each of said hollow seams terminates in an opening, one of said seams encircling the upper portion of said upper rod;
   a three section, jointed frame rod, insertable in said openings of said seams to maintain said limp flag in unfurled condition when in use;
   a base having a lower portion formed by a permanent magnet and an upper portion threadedly attached to the lower portion of said lower rod, said upper portion of said base having external threads therearound;
   a pivot joint in the lower portion of said lower rod, proximate the upper portion of said base;
   a cylindrical lock sleeve around said lower portion of said lower rod and adapted to slide over said pivot joint to make said joint inoperative, said lock having a lower portion with internal threads engageable with the external threads on the upper portion of said base to maintain said pivot joint in inoperative position;
   a lock stop affixed to said lower rod, at a spaced distance above said pivot joint, said lock stop having internal threads;
   and said cylindrical lock having an upper portion with external threads engageable with the internal threads of said lock stop to maintain said lock in inoperative position thereby enabling said pivot joint to pivot and said distress signal to be attached to the side of a vehicle.

* * * * *